United States Patent [19]
Lorenz

[11] 3,826,963
[45] July 30, 1974

[54] DAMPER ACTUATOR CONTROLS FOR AIR CONDITIONING SYSTEMS

[75] Inventor: Jerome L. Lorenz, Columbus, Ohio

[73] Assignee: Ranco Incorporated, Columbus, Ohio

[22] Filed: May 30, 1972

[21] Appl. No.: 257,744

[52] U.S. Cl. .............................. 318/471, 318/681
[51] Int. Cl. ........................................... H02p 1/54
[58] Field of Search.................... 318/681, 678, 471

[56] References Cited
UNITED STATES PATENTS

| | | | |
|---|---|---|---|
| 3,165,681 | 1/1965 | Pinckaers | 318/471 X |
| 3,424,959 | 1/1969 | Gruner | 318/681 X |
| 2,607,532 | 8/1952 | Lehane | 318/471 X |
| 2,595,868 | 5/1952 | Milsom | 318/678 X |

Primary Examiner—B. Dobeck
Attorney, Agent, or Firm—Roy E. Raney

[57] ABSTRACT

A multiple zone air conditioning system is disclosed which employs zone temperature sensing units for producing analog electric signals related to sensed temperatures. Dampers are associated with ducting leading to each zone to regulate the proportions of heated and/or cooled air supplied to the respective zones in response to the sensing unit signal from the respective zone. A damper unit is also provided for regulating the proportions of ventilation and return air circulating within the system as a function of the temperature of the warmest zone. The actuator for each damper is associated with a respective control for governing the position of the damper in response to the zone sensing unit signals.

8 Claims, 3 Drawing Figures

3,826,963

DAMPER ACTUATOR CONTROLS FOR AIR CONDITIONING SYSTEMS

CROSS REFERENCED APPLICATION

United States Application Ser. No. 203,329 filed Nov. 30, 1971 entitled MULTIPLE ZONE AIR CONDITIONING SYSTEM by Merlin E. Demaray.

BACKGROUND OF THE INVENTION

1. Field of the Invention

The present invention relates to condition responsive actuator controls and more particularly to condition responsive actuator controls for dampers in air conditioning systems.

2. The Prior Art

Prior art temperature control systems have been proposed in which the proportions of heated and/or cooled air introduced into an air conditioned space have been controlled by dampers or valves driven by actuators. These actuators sometimes took the form of electric or fluid motors whose operation was governed by electrical control circuits. In some prior art systems, position feedback arrangements interrelated the control circuitry with the motor to dampen operation of the motor, i.e., to minimize "hunting" or oscillations of the valve or damper.

Many prior art proposals employed mechanically actuated control elements for governing the operation of the motors. One typical arrangement employed a fluid filled bellows or power element which, in response to a temperature change in an air conditioned space, would mechanically move the slider of a potentiometer in the actuator control circuitry to change the resistance in a motor controlling circuit. The change in resistance resulted in the actuator motor being operated to reposition a damper or valve in proportion to the change in temperature detected.

With the advent of multiple zone air conditioning systems requiring multiple stages of heating and cooling equipment and numerous independently operated damper units, it became desirable to integrate the damper units and their controls with the control systems for the air conditioning equipment. Mechanically operated damper actuator controls were frequently not compatible with these control systems. That is to say, the temperature sensing components of the air conditioning control systems were frequently constructed such that conventional damper actuators could not be directly controlled by them. Accordingly, separate damper controls were sometimes provided which multiplied the control system components and increased the costs of production, installation and servicing.

In some multiple zone systems, it has been desirable to have the damper units respond to a combination of different temperatures sensed at different locations, for example in a zone and in the duct leading to the zone. The provision of mechanically operated actuator controls for accomplishing such functions further complicated the control systems.

Where a damper unit controls the proportions of ventilation and return air circulating in a system that damper unit should be operable by sensed conditions in whichever of the zones currently requires maximum cooling or ventilation by the outside air. Such control of the damper unit was difficult to achieve by using mechanical sensors since at any given time any one of the zones may be required to control the damper unit.

SUMMARY OF THE INVENTION

The present invention provides a new and improved actuator control circuit which is particularly adapted for use in controlling operation of damper units in a multiple zone air conditioning control system and wherein the actuator control circuit is compatible with and operated from the temperature sensing components of the control system.

According to one preferred construction, a multiple zone air conditioning control system comprises air temperature sensing units associated with each zone which produce analog D.C. electrical signals having values which are related to air temperature sensed at one or more locations in the zone, for example, in the zone or in the duct leading to the zone or in both the zone and the duct. These composite signals are all applied to signal processing circuitry for controlling operation of air heating and/or air cooling equipment. The signal processing circuitry functions to control the air cooling equipment in response to signals in a given range of values from the warmest zone and control the heating units in response to signals in a given range of values from the coolest zone. Cooling of the warmest zone is also accomplished, in appropriate circumstances, by controlling the proportions of outside, or ventilation, air and return air circulating in the system. A ventilation air damper unit is operated from the signal processing circuitry for this purpose.

The zone sensing unit signals are also individually transmitted to damper units associated with the respective zones. Each zone damper unit functions to control the proportions of air flowing to the zone from the heating and cooling equipment and thereby controls the temperature of the air in the associated zone in response to the sensing unit signal for the zone.

An important feature of the invention resides in the provision of a damper actuator which responds to the analog electrical signals produced by a zone temperature sensing unit. In a preferred embodiment of the invention, the damper actuator comprises an electric damper motor which drives a damper between one extreme position in which all, or substantially all, of the air entering the zone has flowed through an air cooling unit and a second extreme position in which all, or substantially all, of the air entering the zone has passed through an air heating unit. The damper is positionable between the extreme positions to enable a substantially constant volume of air to flow to the zone with proportions of the total air flow which have passed through the heating and cooling units being determined by the damper position.

Operation of the damper motor is controlled by a three position switch. When the switch is in a first position, the motor is driven in one directional sense; when the switch is in a second position, the motor is driven in the opposite direction; and in its third position, the switch deenergizes the motor. The switch position is determined by current flowing in a pair of balancing coils in a control circuit. The relative current flows in the coils controls the energization of the motor as well as its direction of operation. When the current flow in the coils is balanced, the switch is positioned to deenergize the motor. When the current in a first one of the coils exceeds the current in the second coil the switch is actuated to drive the motor in one direction and when current in the second coil exceeds current in the first coil the switch is actuated to drive the motor in the opposite direction.

The damper motor also drives a position feedback element in a circuit with the coils so that movement of the damper by the motor in a given direction operates the feedback element to rebalance the current in the coils and deenergize the motor after the damper has changed position to an extent determined by the extent of the initial current imbalance in the coils. This prevents the dampers from overshooting a desired adjusted position.

The current in the coils is initially unbalanced by a change in the zone sensing unit signal indicating that a change in damper position is required to modify the zone temperature. In a preferred construction of the invention, the zone sensing unit signal is applied to the input of an amplifier forming part of the motor controlling circuit. The amplifier has one output connected in circuit with the first coil and a second output connected in circuit with the second coil. When the zone sensing unit signal changes value in one sense direction, e.g. becomes more positive than a previous signal level, current in the first amplifier output increases relative to current in the second output and the coil currents become unbalanced. The motor is consequently energized in a first direction of movement to reposition the damper. The feedback element simultaneously operates to reduce the unbalanced current condition in the coils in relation to the damper position so that the motor is deenergized when the damper reaches an adjusted position related to a change in the zone sensing unit signal.

When the zone sensor signal value varies in the opposite sense direction relative to a previous signal level, e.g. becomes more negative, the current in the second amplifier output increases relative to current in the first amplifier output. This again unbalances the coil currents and causes operation of the motor in the opposite direction of movement. The damper is repositioned while the feedback element reduces the coil current unbalance to terminate operation of the motor when the damper has moved a distance which is related to the change in value of the zone sensing unit signal.

The control circuitry associated with the amplifier is constructed so that the motor is operable only beyond a predetermined threshold value of the zone sensing unit signal. Thus the actuator can be readily adjusted to operate throughout a desired range of zone sensing unit signals within a wider range of sensing unit signal levels.

Where the motor is employed to control the proportions of ventilation and return air circulating in the system, the motor controlling circuitry is adjustable to determine the position of the ventilation air damper when the volume of ventilation air introduced into the system is to be minimized. This permits simple and accurate adjustment of the minimum ventilation air requirements for the system.

Other features of the invention will become apparent from the following detailed description made with reference to the accompanying drawings which form a part of the specification.

DESCRIPTION OF A PREFERRED EMBODIMENT

Figure 1:
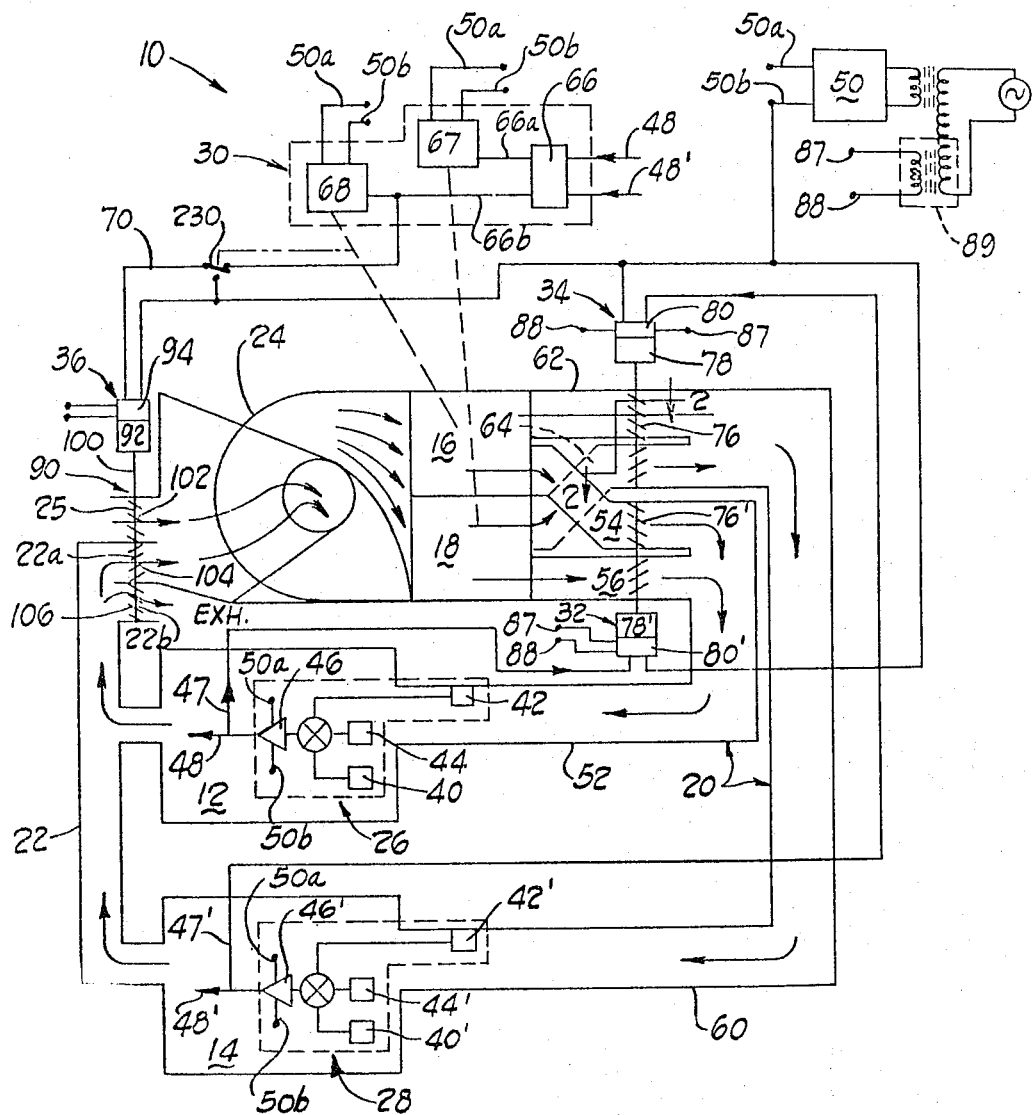
FIG. 1 shows a multiple zone air conditioning system embodying the present invention.

A multiple zone air conditioning system 10 is schematically illustrated in FIG. 1. The illustrated system 10 comprises only two air conditioned zone, indicated at 12 and 14, in order that the description of the system may be simplified, however it should be understood that any reasonable number of zones can be employed in the system. The system 10 further comprises an air cooling unit 16, an air heating unit 18 and supply ducting 20 for directing air from the heating and cooling units to the zones. The air which flows through the zones 12, 14 enters a return duct 22 from which the return air is directed to a blower 24 which recirculates the air across the air cooling and air heating units.

The system 10 includes a temperature control system which comprises a zone sensing unit 26 in the zone 12 and a zone sensing unit 28 in the zone 14. The sensing units 26, 28 produce analog electrical D.C. signals which are directed to signal processing circuitry generally designated at 30. The signal processing circuitry 30 controls operation of the air heating and air cooling units in a manner which is described in greater detail below. The zone sensing units 26, 28 also control operation of damper units 32, 34, respectively, which are located in the supply ducting 20 between the air heating and cooling units and the respective zones.

A damper unit 36 governs the proportion of return and ventilation, or outside, air which are directed to the blower 24 through the return ducting 22 and a ventilation air inlet 25. The damper unit 36 is controlled from the signal processing circuitry 30 as is described in greater detail presently.

The zone sensing units 26, 28 are substantially identical and accordingly only the unit 26 is described in detail. Elements of the unit 28 which are the same as those described in reference to the unit 26 are indicated in the drawing by corresponding primed reference characters. The unit 26 comprises a zone air temperature sensor 40, which may be a thermistor disposed in the zone at a suitable location for producing an electrical signal indicative of zone air temperature; a duct sensor 42, which may also be a thermistor, disposed in the supply duct leading to the zone 12 for producing a signal indicative of duct air temperature; and a set point adjustment variable resistor element 44 for producing an electrical signal indicative of a desired zone air temperature. The element 44 is manually adjustable by a person in the zone.

The signals produced by the elements 40, 42, 44 are algebraically combined by a suitable summing arrangement and transmitted to the input of a linear amplifier 46. The amplifier 46 functions to amplify the algebraic sum of the signals produced by the elements 40, 42, 44 and produces a D.C. analog output, or command, signal. The amplifier comprises output conductors 47, 48 connected to the associated zone damper unit and the signal processing circuitry 30, respectively. Operating power for the amplifier and circuitry associated with the amplifier is provided by a regulated D.C. power supply 50 having output terminals 50a, 50b.

The system 10 is of a type known as a constant volume system in that a constant volume of air is supplied to each zone at all times regardless of the heating or cooling required by that particular zone. The supply ducting 20 comprises a supply duct 52 for the zone 12 through which a constant volume of air is directed to the zone. The duct 52 comprises a first branch 54 through which air which has been directed across the air cooling unit 16 enters the duct 52. A second branch 56 of the duct carries air which has passed across the air heating unit 18. Air which has flowed through the duct branches 54, 56 is mixed in the duct 52 and directed into the zone 12.

A duct 60 carries a constant volume of supply air to the zone 14 from the air heating and cooling units. The duct 60 comprises a first branch 62 through which air which has passed across the air cooling unit enters the duct 60. A second duct branch 64 directs air from across the air heating unit into the duct 60. The air which has flowed through the branches 62, 64 is mixed as it flows through the duct 60 to the zone 14.

The return air ducting 22 receives the air which has flowed through the zones 12, 14. A portion of the air which flows through the return ducting 22 recirculates through the system via a return air opening 22a while a portion of the return air is exhausted from this system through an exhaust air opening 22b. The air which is exhausted through the opening 22b is replenished by a flow of air through the ventilation air inlet 25. The damper unit 36 controls the proportion of return and ventilation air which are provided to the system by governing the flow through the openings 22a, 22b and 25.

The signal processing circuitry 30 comprises a logic unit 66 to which the zone signals from the units 26, 28 are transmitted via the outputs 48, 48'. The logic unit has a pair of outputs 66a, 66b which are connected to a signal responsive heating controller unit 67 and a signal responsive cooling controller unit 68, respectively. A signal produced by a coolest zone is transmitted to the controller unit 67 by the output 66a while the signal produced by the warmest zone is transmitted to the controller 68 via the conductor for the output conductor 66b of the logic circuit.

If more than two zones are controlled by the system the logic unit 66 will have one input for each of the zones but only two outputs regardless of the number of zones, one output for transmitting the signal produced by the coolest zone and the other for transmitting the signal produced by the warmest zone. As is shown in FIG. 1, the controllers 67, 68 are each connected across the output terminals 50a, 50b of the power supply 50. Signal processing circuitry of the type referred to is illustrated and described in detail in the cross referenced application to Demaray to which reference should be made for a more complete understanding of the construction and function of the signal processing circuitry.

The damper units 32, 34 are connected to the outputs 47, 47' of the sensing units 26, 28, respectively, and to the power supply terminal 50b and are thus individually controlled from their respective sensing units. The damper unit 36 for controlling the supply of the ventilation and return air is operated from the logic unit output 66b through a conductor 70 so that the damper unit 36 is controlled in response to a signal produced by the warmest zone.

The damper units 32, 34 are identical and accordingly only the damper unit 34 is described and parts of the unit 32 which are the same as parts of the unit 34 are indicated by corresponding primed reference characters. The unit 34 comprises a damper assembly 76, an actuator 78 and an actuator control 80. The damper assembly 76 (see FIG. 2) comprises a shaft 82 which extends from the actuator 78 through the duct branches 62, 64. The shaft is rotatable about its axis by the actuator 78 and carries a damper blade 84 stationed in the duct branch 62 and a damper blade 86 stationed in the duct branch 64.

Figure 2:
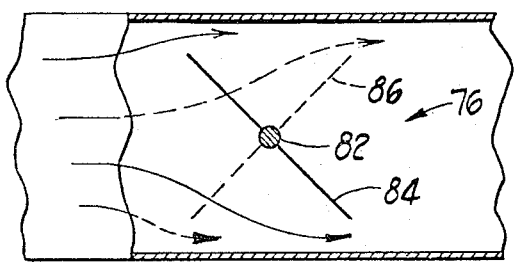
FIG. 2 is a cross sectional view seen approximately from the plane indicated by the line 2—2 of FIG. 1; and, FIG. 3 is a schematic diagram of an actuator control embodying the present invention.

As is shown in FIG. 2 the damper blades 84, 86 project radially from the shaft 82 and are disposed at 90° angles with respect to each other in the duct branches. The shaft 82 is rotatable throughout a 90° angle about its axis between the first limit position in which the duct blade 84 is positioned to block flow through the duct branch 62 and a second limit position in which the damper blade 86 is positioned to block air flow through the duct branch 64. In the first limit position of the shaft 82 all of the air passing through the duct 60 flows through the air heating unit 18 and the duct branch 64. In the second limit position all of the air flowing through the duct 60 passes through the air cooling unit 16 and the duct branch 62. In the intermediate positions, the proportions of air entering the ducts 60 from the branches 62, 64 depend upon the positioning of the shaft 82.

The illustrated actuator 78 comprises a reversible A.C. electric motor which is drivingly connected to the shaft 82 through a gear reduction, not shown. The motor 78 is connected across terminals 87, 88 of an A.C. power supply provided by a transformer 89.

The ventilation air damper unit 36 comprises a damper assembly 90, a damper actuator 92 and an actuator control 94. The damper assembly 90 comprises a shaft 100 which extends across the ventilation air inlet opening 25, the return air opening 22a, and the return air exhaust opening 22b. Damper blades 102, 104, 106 are supported by the shaft 100 and extend across the respective openings. The damper blades 102 and 106 are oriented at right angles with respect to the damper blades 104 so that the flow rates of the exhaust and ventilation air are the same at all times. As the shaft 100 is rotated about its axis in one direction to a first limit position, the damper blades 102, 106 move to provide minimum flows of ventilation and exhaust air through their respective openings while flow of return air from the duct 22 to the blower 24 is maximized. As the shaft 100 is rotated in the opposite direction to a second limit position, the damper blades 102, 106 are fully opened so that the flow of ventilation air into the system is maximized while all of the air flowing through the return duct 22 is exhausted from the system. This condition will occur when the temperature of the outside air is sufficient to satisfy the load on the zones without operation of the heating or cooling equipment.

Figure 3:
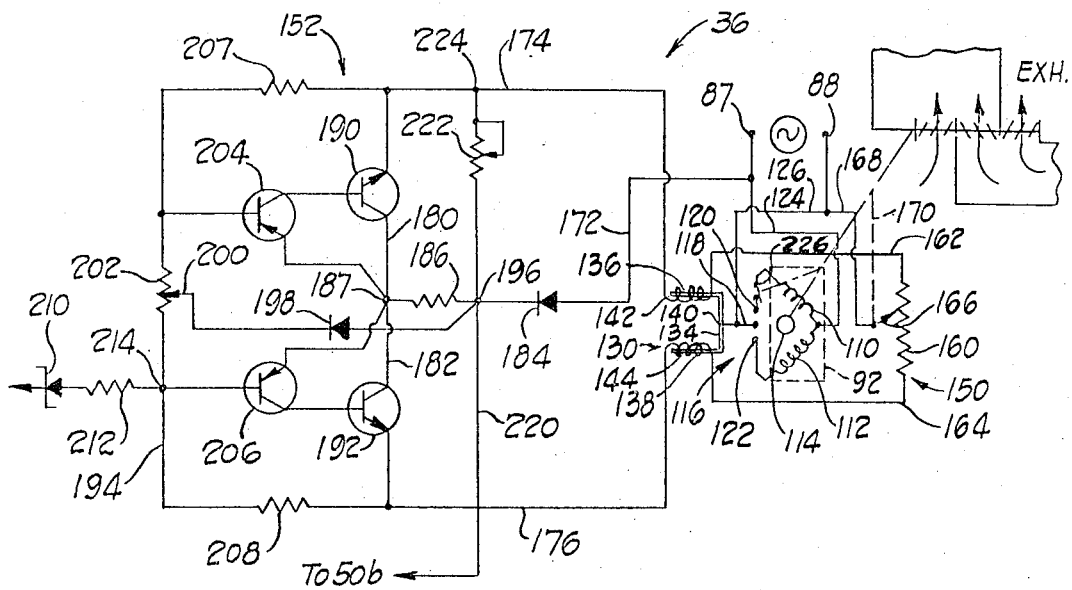

FIG. 3 schematically shows the damper unit 36. The unit 36 comprises an actuator motor 92 having a clockwise field winding 110, a counterclockwise field winding 112 and a rotor 114.

Operation of the motor 92 is controlled by a three position switch 116 which comprises a moving contact arm 118, and a pair of fixed contacts 120, 122. When the moving contact 118 is engaged with the contact 120 a circuit is completed through the clockwise winding 110 of the motor between the power supply terminals 87, 88 through a conductor 124, the winding 110, the contacts 118, 120 and a conductor 126. This drives the rotor 114 clockwise to move the damper assembly 90 toward its fully open position in which the flow of ventilation air into the system is maximized and the air flowing in the return duct 22 is exhausted from the system. When the contact 118 is engaged with the fixed contact 122, the counterclockwise winding 112 is energized through a circuit connected across the power supply through the conductors 124, 126 and the rotor 114 is operated counterclockwise to move the damper assembly 90 toward a position in which the flow of ventilation air into the system is minimized and most of the air in the system is recirculated. When the movable contact 118 is positioned between the contacts 120, 122, as illustrated, the windings 110, 112 are disconnected from the power supply. The moving contact 118 is preferably biased toward the motor deenergizing position by suitable biasing elements, not shown.

The actuator control 94 comprises a balancing relay 130 which governs the position of the moving contact 118. The balancing relay comprises a U-shaped core having a bight portion 134 and legs 136, 138 projecting from the bight portion. The core is pivoted about a pivot axis 140 extending through the bight portion 134 and electromagnetic coils 142, 144 are disposed about the legs 136, 138.

The position of the switch 116 is determined by the difference in currents passing through the coils 142, 144. The coils 142, 144 are connected in parallel across the power supply terminals 87, 88 through a position feedback impedance arrangement 150 and a condition responsive impedance network 152. When the currents flowing through the coils 142, 144 are the same, i.e. balanced, any forces produced by the coils acting on the core are balanced and the contact 118 in its illustrated intermediate position. When current flow through the coil 144 exceeds current flow through the coil 142, the contact arm 118 is moved to engage the contact 122 so that the motor is operated in a counterclockwise direction. When current flow through the coil 142 exceeds current flow through the coil 144 the contact arm 118 engages the contact 120 and the motor operates clockwise.

The position feedback impedance arrangement 150 and the condition responsive impedance network 152 cooperate so that when the zone sensing unit signal across the conductor 70 and the terminal 50b is a steady state signal, the currents through the coils 142, 144 are balanced and the motor 92 is deenergized with the damper assembly 90 in a particular position. When the sensing unit signal level changes, the motor 92 is energized to drive the damper assembly 90 in a direction depending upon the direction of energization of the motor while the feedback impedance arrangement 150 is driven from the motor to oppose the unbalance in the coil currents and rebalances the coil currents after an amount of movement of the damper assembly 90 which depends upon the change in level of the sensing unit signal.

In the preferred embodiment, the feedback impedance arrangement 150 comprises a potentiometer 160 which is connected between the ends of the coils 142, 144 by conductors 162, 164. The potentiometer 160 comprises a slider 166 connected to the power supply terminal 88 by a conductor 168. The slider 166 is driven by the motor rotor 114 through a schematically illustrated linkage 170. When the motor 92 is driven clockwise the linkage 170 moves the slider 166 away from the conductor 162. This increases the resistance in series with the coil 142 while reducing the resistance in series with the coil 144. After a given amount of movement of the slider the resistances in series with the coils 142, 144 are such that the coil currents are balanced and the switch 116 deenergizes the motor.

Likewise, when the motor 92 is driven counterclockwise the slider 166 is moved away from the conductor 164. This increases the resistance in series with the coil 144 while reducing the resistance in series with the coil 142. After a given amount of slider movement the coil currents are balanced and the switch 116 deenergizes the motor.

The network 152 controls the current unbalance in the coils 142, 144 in response to sensing unit signals. The network 152 is supplied with power from the power supply terminal 87 through a conductor 172 and is connected to the power supply terminal 88 through the coils 142, 144 and the feedback potentiometer 160 via conductors 174, 176.

The network 152 comprises a two stage amplifier connected to the power supply terminal 87 by a conductor 172 and connected to the power supply terminal 88 through the coils 142, 144 and the feedback potentiometer 160 via conductors 174, 176. The amplifier functions to control the current in the conductors 174, 176 in response to signal voltage levels, within a predetermined range, established across the conductor 70 and the reference terminal 50b of the D.C. power supply 50.

The amplifier comprises first and second output circuits 180, 182 for controlling current flow to the coils 142, 144, respectively. The output circuits are connected to the power supply terminal 87 via the conductor 172, a rectifier diode 184, a voltage dropping resistor 186 and a junction 187. The output circuit 180 is connected between the junction 187 and the conductor 174 and includes the emitter-collector circuit of an NPN transistor 190. The current in the output circuit 180 is thus governed by the conductive condition of the transistor 190. The output circuit 182 is connected between the junction 187 and the conductor 176 and comprises the emitter-collector circuit of an NPN transistor 192 so that current in the output circuit 182 is governed by conduction of the transistor 192.

An input circuit 194 for the amplifier is connected across the conductors 174, 176 and to the conductor 172 through a junction 196, a diode 198 and the slider 200 of a potentiometer 202. The bases of PNP input transistors 204, 206 are connected in the input circuit 194 at opposite ends of the potentiometer 202 and the biasing voltage levels at the bases of the input transistors 204, 206 are controlled by positioning the slider 200 to a desired location along the potentiometer. The diode 198 provides compensation for temperature effects on the base to emitter voltage drops of the transistors 204, 206.

The input transistor 204 is complementarily coupled to the transistor 190 with the emitter-collector circuit of the transistor 204 connected between the junction 187 and the base of the transistor 190. Degenerative feedback is provided by a resistor 207 connected between the emitter of the transistor 190 and the base of the transistor 204. The resistor 207 also functions to reduce temperature induced gain effects of the transistors 190, 204.

The transistor 206 is complementarily coupled to the transistor 192 with its emitter-collector circuit connected between the junction 187 and the base of the transistor 192. Degenerative feedback is provided between the emitter of the transistor 192 and the base of the transistor 206 by a resistor 208. The resistor 208 also functions to reduce temperature induced gain effects on the transistors 192, 206.

The input circuit 194 is connected to the zone sensing unit signal via the conductor 70 so that, after the potentiometer 202 is adjusted to control the base bias voltages applied to the transistors 204, 206 as desired, the amplifier is controlled by sensing unit signals, within a given range. The conductor 70 is connected to the input circuit 194 through a Zener diode 210, a resistor 212 and a junction 214. The condition signal circuit is completed to the power supply reference terminal 50b through a conductor 220 connected to the junction 196.

Adjustment of the network 152 for operation is easily accomplished. With no input signal from the conductor 70, pulsating D.C. is supplied to the amplifier via the conductor 172 and diode 184. In this condition of the circuitry, the potentiometer 202 is adjusted so that the transistors 206 and 192 are rendered conductive by the applied D.C. power and the transistors 204, 190 are nonconductive. This causes an unbalance of the coil currents resulting in pivoting of the relay core clockwise about the pivot 140 to close the switch contacts 118, 122. The motor 92 is energized to move the damper assembly 90 toward the minimum ventilation position. When the ventilation air opening 25 is completely closed, the slider 166 of the feedback potentiometer 160 is positioned so that the coil currents are again balanced and the motor 92 is deenergized.

Some minimum amount of ventilation air is required in nearly all systems of the character described so that when the damper assembly 90 is in its limit position some ventilation air must be admitted to the system. The minimum ventilation air position of the damper assembly is adjusted by a potentiometer 222 connected in parallel with the transistors 190, 204 between a junction 224 and the junction 196. The potentiometer shunts current around the transistors 190, 204 and thus provides current to the coil 142 when the transistors are nonconductive. Adjustment of the slider of the potentiometer 222 controls the minimum current in the coil 142 and thus determines the minimum ventilation air position of the damper assembly 90. Thus in the minimum position, the ventilation air opening 25 is partially opened to the extent of the adjustment of the potentiometer 222.

In the illustrated embodiment of the invention, the Zener diode 210 and resistor 212 control the lower limit of the range of sensing unit signals to which the network 152 responds. When the sensing unit signal level is below the Zener voltage of the diode 210 the damper assembly 90 remains in its minimum ventilation air position. This positioning of the damper assembly is maintained when the warmest zone is cooler than its set point temperature level and heating of all of the zones is required.

As the temperature of the warmest zone increases and approaches the set point temperature level the sensing unit signal applied across the diode 210 exceeds the Zener voltage and the signal is applied to the input circuit 194. The application of this signal to the input circuit 194 increases the voltage level at the base of the transistor 206 and reduces the conductivity of the transistors 206, 192.

The input transistor 204 is emitter coupled to the input transistor 206 so that when the transistor 206 becomes less conductive, the transistor 204 becomes conductive. The transistor 190 is rendered conductive by the transistor 204 and the resulting unbalance of the coil currents causes the damper assembly 90 to move away from the minimum ventilation air position by an amount determined by the level of the applied sensing unit signal relative to the Zener voltage of the diode 210. The feedback arrangement 150 rebalances the coil currents to terminate operation of the motor 92. It should be noted that when the damper assembly is in its minimum ventilation position the transistors 190 and 204 are nonconductive but are preferably just on the verge of conduction.

As the sensing unit signal applied to the conductor 70 progressively increases, the transistors 190, 204 become progressively more conductive while the transistors 206, 192 become progressively less conductive. Accordingly, the damper assembly 90 is progressively moved toward its limit position in which the outside air opening 25 is fully open and all of the air in the return duct is exhausted from the system.

The value of the resistor 212 is selected to determine the increase in sensing unit signal voltage, above the Zener voltage of the diode 210, required to drive the motor 92 from its minimum ventilation air position to its fully open position.

When the damper assembly reaches its fully open position, i.e. when no air in the system is recirculated, the motor 92 is prevented from further operation in the clockwise direction by a suitable device such as a limit switch 226 (schematically shown in FIG. 3), which may be operated by the motor or damper assembly to interrupt the circuit through the clockwise field winding 110.

The damper assembly 90 is in its fully open position when the warmest zone is above the set point level but prior to the signal level at which operation of the air cooling equipment is initiated. In this range of signal levels the ventilation air is utilized to cool at least the warmest zone. When the air cooling equipment is operated, the supply of ventilation air must again be minimized in order to recirculate chilled air in the system and maximize the cooling effect of the air cooling equipment. In the illustrated embodiment of the invention this is accomplished by a single throw double pole switch 230 (FIG. 1) which is linked to the controller 68 so that when the cooling controller 68 initiates operation of the cooling unit the cathode electrode of the Zener diode is connected to the reference terminal 50b of the power supply 50. This results in the motor 92 continuously driving the damper assembly 90 to its minimum ventilation position and being maintained in that position until the controller 68 deactivates the air cooling equipment.

The actuator controls for the zone damper units 32, 34 are the same as described in reference to the actuator control for the ventilation damper unit 36 (FIG. 3) except that the potentiometer 222 need not be employed to establish a minimum cool air flow condition for the associated zone.

Although one preferred embodiment of the invention is illustrated and described herein, the invention should not be considered limited to the precise construction shown. It is intended to cover hereby all adaptations, modifications and uses of the invention which come within the scope of the appended claims.

What is claimed is:

1. In an electrically operated control for an actuator including a three position switch means having a first position for effecting operation of the actuator in one direction of movement, a second position for effecting operation of the actuator in the opposite direction of movement and a third position for preventing operation of the actuator; first and second electric current responsive elements connected respectively in first and second parallel circuits, said current responsive elements effective to apply current responsive actuating forces to said switch means for operating said switch means between said positions; said elements effective to maintain said switch means in said third position when the currents flowing through said elements are such that the forces applied by said elements to said switch means are substantially equal, to operate said switch means to said first position when the force applied to said switch means by said first element is a predetermined amount greater than the force applied by said second element, and to operate said switch means to said second position when the force applied to said switch means by said second element is a predetermined amount greater than the force applied by said first element; and variable impedance feedback means having first and second terminals connected to said first and second parallel circuits respectively and a movable contact electrically connected to said first and second parallel circuits and linked to said actuator for changing the respective impedances between said contact and said first and second terminals in response to operation of the actuator to vary the current flow through said elements in a manner to balance the actuating forces applied thereby to said switch means; the improvement comprising: condition responsive signal means for producing an electrical analog signal related to a sensed condition; and amplifier means for governing current flow in said first and second parallel circuits in response to said analog signal; said amplifier means comprising a first output circuit connected in said first parallel circuit and a second output circuit connected in said second parallel circuit, said output circuits responding to changes in a sensed condition by unbalancing current flows in said first and second parallel circuits to effect operation of said actuator and said feedback means functioning to rebalance current flows in said first and second parallel circuits in response to operation of said actuator.

2. An actuator control as claimed in claim 1 further including signal limiting means between said amplifier means and said condition responsive signal means for preventing analog signals from being applied to said amplifier means when signal levels are less than a predetermined magnitude.

3. An actuator control as claimed in claim 1 further comprising adjustably variable impedance means connected in parallel with one of said amplifier output circuits and in series with the respective current responsive element to provide a predetermined minimum current flow to said respective current responsive element and thereby determine a limit position of the actuator.

4. A condition responsive control for an electrically controlled actuator operable in first and second directions of movement comprising:

a. first and second power terminals;

b. switch means connected between one of said first and second power terminals and said actuator, said switch means comprising a movable member having a first position wherein the actuator is energized and operated in one direction, a second position wherein the actuator is energized and operated in the other direction and a third position wherein the actuator is deenergized, said movable member biased toward said third position;

c. first and second circuits connected in parallel across said power terminals for controlling the position of said movable member to govern the direction and extent of movement of the actuator, each of said circuits comprising a current responsive element for applying a current responsive force to the movable member to urge said member toward one of said first or second positions, said forces applied to said movable member by said elements opposing each other whereby when the applied forces are equal the actuator is deenergized and when the applied forces are unequal said actuator is operated in one of said directions;

d. current controlling means comprising a variable impedance feedback element having a first terminal connected to said first circuit, a second terminal connected to said second circuit, and a slider element electrically connected to said first power terminal and said first and second circuits, said slider element mechanically supported for movement relative to said feedback element to vary the impedances between said feedback element terminals and said slider element in relation to movement of the actuator, said feedback element functioning to chage the current flows in said first and second circuits in relation to movement of the actuator to rebalance the forces applied to said movable member by said current responsive elements and terminate operation of the actuator; and, e. means for unbalancing the forces applied by said current responsive elements to initiate operation of the actuator comprising amplifier means having a first output circuit connected in said first circuit and to said second power supply terminal and a second output circuit connected in said second circuit and to said second power terminal, and condition responsive signal producing means providing a condition responsive signal to an input circuit of said amplifier means, said first and second amplifier output circuits unbalancing the current flows through said first and second current responsive elements in relation to changes in the sensed condition to effect operation of said actuator.

5. A control as claimed in claim 4 wherein said signal producing means provides an analog electrical signal and wherein said amplifier means comprises at least one signal responsive circuit element for increasing the conductivity of said first amplifier output circuit and decreasing the conductivity of said second amplifier output circuit in response to changes in said condition responsive signal in one sense direction and for increasing conductivity of said second amplifier output circuit and decreasing conductivity of said first amplifier output circuit in response to changes in said condition responsive signal in the opposite sense direction.

6. The control claimed in claim 4 further comprising circuit means between said condition responsive signal producing means and said amplifier means for transmitting only condition responsive signals beyond a predetermined threshold value to said amplifier means, said amplifier means and said feedback element cooperating to maintain the actuator in one limit position when said circuit means blocks transmission of condition responsive signals to said amplifier means.

7. The control claimed in claim 6 further comprising a variable resistance element connected between said second power terminal and said first circuit in parallel with said first amplifier output circuit, said variable resistance element governing the limit position of the actuator at one extreme end of its travel in one direction.

8. The control claimed in claim 6 wherein said circuit means comprises a voltage breakdown element which blocks condition responsive signals producing voltages across said breakdown element which are less than a predetermined voltage and which breaks down and conducts when voltages thereacross exceed said predetermined voltage.

* * * * *